Oct. 27, 1942.  B. R. POOL  2,300,313
FUEL INJECTION PUMP FOR INTERNAL COMBUSTION ENGINE
Filed July 26, 1938  6 Sheets-Sheet 2

Inventor

B. R. Pool

By Clarence A. O'Brien
and Hyman Berman
Attorneys

Oct. 27, 1942.  B. R. POOL  2,300,313
FUEL INJECTION PUMP FOR INTERNAL COMBUSTION ENGINE
Filed July 26, 1938  6 Sheets-Sheet 3

Inventor
B. R. Pool

By Clarence A. O'Brien
and Hyman Berman
Attorneys

Oct. 27, 1942.    B. R. POOL    2,300,313
FUEL INJECTION PUMP FOR INTERNAL COMBUSTION ENGINE
Filed July 26, 1938    6 Sheets-Sheet 4

Inventor
B. R. Pool
By Clarence A. O'Brien
and Hyman Berman
Attorneys

Oct. 27, 1942.　　　　　B. R. POOL　　　　　2,300,313
FUEL INJECTION PUMP FOR INTERNAL COMBUSTION ENGINE
Filed July 26, 1938　　　　6 Sheets-Sheet 6

Inventor
B. R. Pool

By 
Attorneys

Patented Oct. 27, 1942

2,300,313

UNITED STATES PATENT OFFICE 2,300,313

FUEL INJECTION PUMP FOR INTERNAL COMBUSTION ENGINES

Byron R. Pool, Mount Carmel, Ill., assignor to Theodore K. Coleman, Mount Carmel, Ill.

Application July 26, 1938, Serial No. 221,405

6 Claims. (Cl. 103—173)

This invention relates to a fuel injection pump, and has for the primary object the provision of a device of this character which will efficiently inject fuel into the cylinders of an internal combustion engine of the Diesel or electric ignition type and which will be compact, durable and easily installed on an engine now in use or on an engine under construction and is so constructed that all parts thereof are readily accessible for adjustment and repair and may be manufactured, sold and serviced at a low cost.

Prior pumps of the type here under consideration have been generally unsatisfactory in that they have been both expensive and difficult for the average service man to service. The constructions have been such that the interchangeability of factory-serviced parts is practically impossible and the action of the pumps have been characterized by the development of vapor locks. In accommodating one pump to different type engines, considerable modification of the pump has been required, even to the extent of grinding the cam shaft to conform with the firing order of the specific engine.

In overcoming the aforesaid disadvantages of the prior art and other undesirable characteristics of the prior devices, it is a major object of this invention to provide a novel fuel pump arrangement, particularly adapted for an internal combustion engine, wherein the use of factory-serviced parts with ready interchangeability is possible, and the development of vapor lock which calls for the necessity of "bleeding" the fuel system and the delivery system of air bubbles and consequent halting of the operation of the engine is eliminated.

Still a further object of this invention is the provision of a novel fuel pump wherein the interchangeability of parts is facilitated by a novel unit construction of plunger body, plunger body check valve, fuel injection pump, head assemblies and other units of the pump, the construction of the pump being such that it can be readily adapted to engines having like numbers of cylinders, regardless of their firing order. More specifically, it is an object of this invention to provide such a pump wherein a plunger body assembly can be removed and a factory-serviced unit replaced without disturbing the timing of the engine in much the same manner as the present-day factory-serviced ignition systems are installed in gasoline automotive vehicles.

It is still a further object of this invention to provide a novel fuel pump construction having a broader range of adaptation to different engines with the same number of cylinders but of different sizes as regards to piston displacement wherein the maximum delivery of the pump may be readily adjusted to adapt it to a particular engine on which it is to be used.

Another object of this invention is the provision of means for the prevention of vapor locks and to permit complete removal of all air bubbles which may tend to affect the efficient operation of the device or to interfere with the proper functioning of the engine from improper injection of fuel into the cylinders thereof. More specifically, novel means is provided for insuring the rapid flow and return of the fuel not fed to the engine to the fuel supply system whereby the excess fuel is always kept in rapid motion and is never in a static phase.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 7 is a vertical sectional view illustrating the fuel injection pump including the principle of operation as disclosed in the diagrammatical views numbered from 1 to 5, inclusive.

To set forth the basic principles of this invention, reference to Figures 1 to 6 will be first given and these figures only diagrammatically show the present invention for the injection of fuel into a single cylinder engine (not shown) wherein the body of the pump is indicated by the character 5 having a bore 6 for rotatably and slidably receiving a valve element 7 in the form of a shaft for controlling the bypassing of fuel back to a fuel source (not shown). The escape of fuel to the fuel source will be at the end of the bore 6 designated by the character A. The body 5 has formed therein a cylinder 8 in which is reciprocally mounted a plunger 9 acting as a piston and is carried by a cam tappet assembly 10 including a roller 11 to ride a cam 12. The assembly 10 is urged to ride the cam 12 by a coil spring 13. The pump body 5 is also provided with a check valve chamber 14 in which operates a spring influenced check valve 15. A seat 16 is provided for the check valve 15 between the valve chamber 14 and the cylinder 8. A fitting 17 is mounted in the valve chamber 14 and is adapted for connection in any well known manner to a cylinder of an engine.

Figure 6:
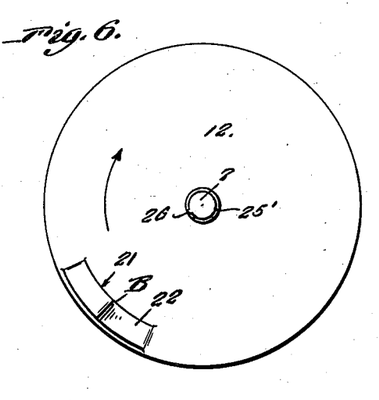
Figure 6 is a plan view illustrating a cam construction for the operation of the pump plunger.
Figure 8:
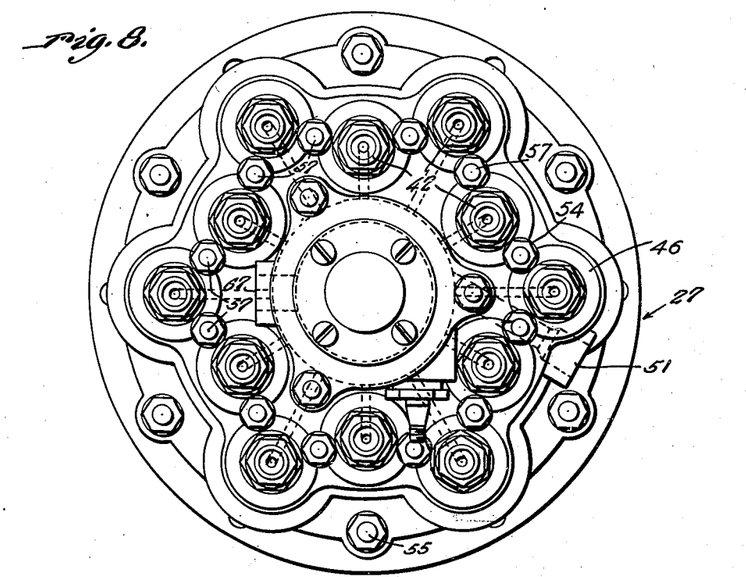
Figure 8 is an end view illustrating the pump arranged for the injection of fuel into a twelve-cylinder engine.

The cam 12 is in the form of a disc 18 including a hub 19 in which is splined the bypass valve element 7, as shown at 20. The cam 12 further includes a high portion 21 having oppositely sloping faces 22 gradually merging into the top face of the disc 18 and meeting with each other to provide the high point or portion of the cam, as indicated by the character B.

The sliding movement of the bypass valve element 7 is controlled by a pivotally mounted hand lever 23 connected to said bypass valve element 7, as shown at 24, whereby the valve element 7 is free to rotate. It is to be understood that the valve element 7 is power driven, connected in any well known manner to the cam shaft of the engine. Such details as the connection of the valve element 7 with the cam shaft of the engine will be hereinafter described in detail when referring to the complete detail construction of the pump.

The valve body 5 is further provided with fuel passages 24 and 25. The fuel passage 24 is adapted to receive fuel from the source under low pressure and is connected with the cylinder 8 to be uncovered by the plunger 9 when in its lowermost position. The fuel passage 25 is connected to the cylinder 8 and to the bore 6 which goes to make up the bypass for the fuel from the cylinder 8 back to the fuel source by way of the end A of the bore 6.

The upper end of the bypass valve element 7 is reduced to form a portion 25' for opening the by-pass fuel passage 25 to the bore 6. The reduced portion 25' of the valve element presents a portion 26 increasing in width towards its lower end for the purpose of closing the fuel passage 25 to the bore 6. The foregoing description briefly sets forth a construction of fuel injection pump so that the basic principle of operation which will now be given will be clearly understood.

It is to be understood that the bypass valve element 7 is in continuous rotation as long as the engine is operating and as the cam 12 is secured for rotation with said bypass valve element 7 it will effect reciprocation of the plunger 9 to bring about injection of the fuel into the cylinder of the engine in proper firing time employed in the operation of the engine. To increase and decrease the speed of the engine the bypass valve element 7 is manually adjusted endwise in opposite directions through the manipulation of the hand lever 23.

Figure 1:
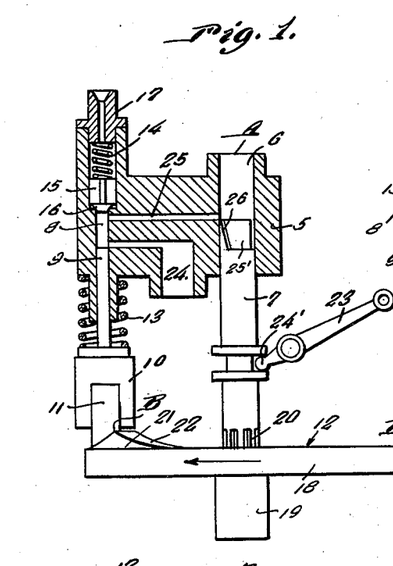
Figure 1 is a diagrammatical view, showing the injecting pump plunger and the means of bypassing of the fuel back to the fuel supply with the parts of the device positioned during non-operation of the engine.

The position of the bypass valve element 7 by the hand lever 23, as shown in Figure 1, brings about non-operation of the engine or for stopping the operation of the engine. The bypass valve element 7 when positioned as shown in Figure 1 permits a complete bypassing of the fuel from the passage 24 back to a fuel supply as the fuel passage 25 is completely uncovered by the valve element 7 and the spring 14 holds the check valve 15 in a seated position. The spring 14 is of sufficient strength to maintain the check valve 15 seated under the low pressure of the fuel as received from the supply in the fuel passage 24 and cylinder 8.

Figure 16:
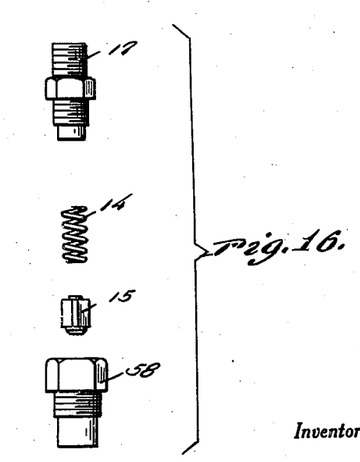
Figure 16 is an exploded view illustrating a pressure operated check valve.

As shown in Figure 26 wherein the check valve is shown in an exploded view, the valve assembly includes a housing 58 having a valve seat therein, valve 15, valve spring 14, and connection 17. This construction provides a unitary assembly that can be assembled at the factory and easily replaced in the field. Likewise the simplicity of the valve enables it to be readily dismantled and serviced in the field.

Figure 2:
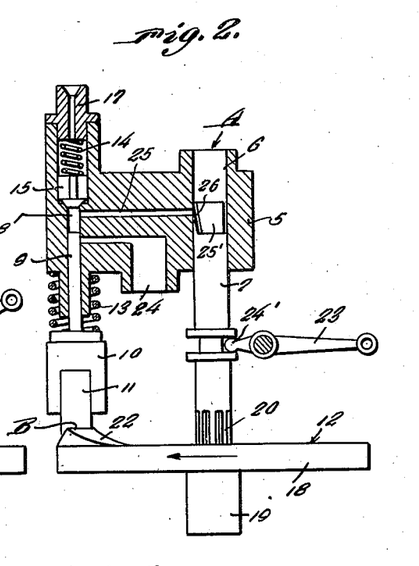
Figure 2 is a view similar to Figure 1 showing the injecting pump plunger compressing the fuel and injecting the same into a cylinder of an engine for sustaining the engine running at idling speed.
Figure 3:
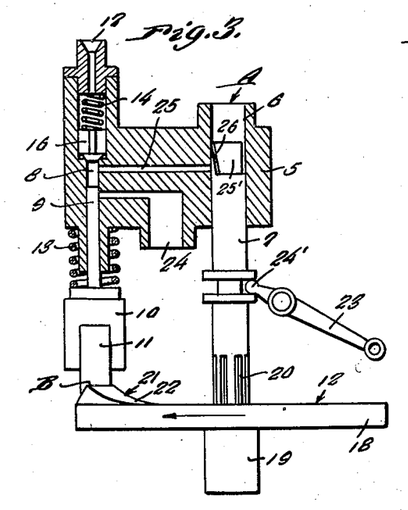
Figure 3 is a view similar to Figure 2 showing the parts positioned for increasing the speed of operation of the engine over idling speed and with the pump plunger acting to compress and inject the fuel into the cylinder of the engine.
Figure 4:
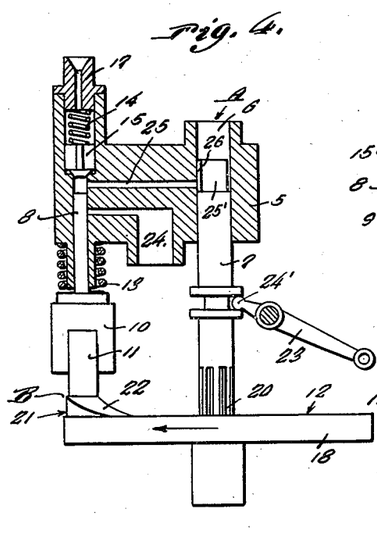
Figure 4 is a view similar to Figure 3 the pump plunger occupying a position further up in the cylinder were the compression and injection of the fuel into the engine has been substantially completed.
Figure 5:
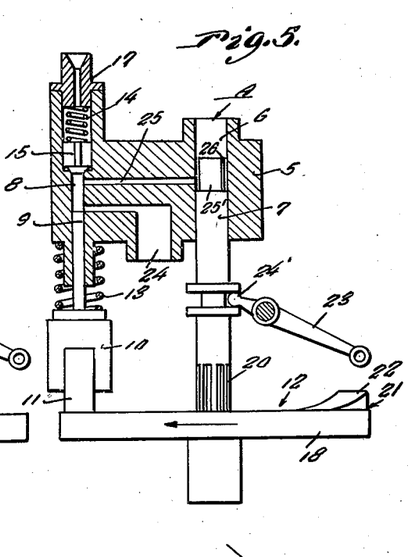
Figure 5 is a view similar to Figure 4 showing the pump plunger returned to non-fuel compressing position and the bypass means fully open.

To operate the engine at idling speed or to permit a minimum amount of fuel to be injected into the cylinder of the engine, the hand lever 23 is positioned, as shown in Figure 2, which brings about a slight upward movement of the bypass valve element 7. As long as the reduced part 25' of the valve element is in communication with the fuel passage 25 a complete bypassing of the fuel back to the supply will be had. However, as the roller 11 of the tappet assembly 10 starts up one of the faces 22 of the cam towards the high part B the plunger is started on its compression stroke and the portion 26 of the valve element 7 closes the passage 25 to the bore 6 stopping the bypassing of the fuel back to the supply, permitting the plunger to increase the pressure of the fuel in the cylinder 8 to bring about opening of the check valve 15. As soon as the check valve opens the fuel is injected into the cylinder of the engine. It is to be understood that the valve element 7 is rotating during the compression stroke of the plunger 9 and as soon as the plunger has traveled a sufficient distance to bring about compressing of the fuel sufficient to unseat the check valve 15 the portion 26 moves past the end of the passage 25 opening the latter to the bore 6 restoring the bypassing of the fuel back to the fuel supply and consequently stopping the injection of the fuel into the cylinder of the engine as the pressure of the fuel is immediately lowered by the passing of the fuel back to the fuel supply allowing the spring 14 to seat the check valve 15. The roller 11 of the tappet assembly 10 may be still traveling on the inclined face towards the high part B of the cam. However, the injection of the fuel into the cylinder of the engine has been stopped due to the valve element 7 or the part 26 uncovering the end of the fuel passage 25 to restore the bypassing of the fuel back to the fuel supply. The plunger 9 is returned to its lowermost position as soon as the roller 11 of the tappet assembly 10 passes off of the other inclined face 22 after passing the high part B of the cam and coming into engagement with the top face of the disc 18 of the cam. The plunger 9 remains in its non-fuel compressing position as long as the roller 11 rides the top face of the disc 18 of the cam thus permitting the several cycles of operation of the engine to be completed before the plunger 9 again compresses and injects a charge of fuel into the cylinder. The length of time that the plunger 9 is permitted to increase the pressure of the fuel in the cylinder 8 depends on the vertical adjustment of the valve element 7 which brings about adjustment of the tapered portion 26 of said valve element 7 with respect to the end of the bypass fuel passage 25. To increase the speed of the engine by permitting the plunger 9 to inject a greater amount of fuel into the cylinder, the hand lever 23 is moved downwardly raising the valve element 7 to increase the length of time that the bypass fuel passage 25 will be covered by the portion 26 of said valve element 7, it being apparent from the drawings that the portion 26 increases in width towards its lower end from its upper end so that as the valve element 7 is raised the fuel passage 25 will be closed for a longer period of time to prevent bypassing of the fuel back to the fuel supply and consequently increase the length of time that the fuel is compressed by the plunger 9 and thereby bring about an increased amount of fuel injected into the cylinder of the engine by each compression stroke of the plunger 9. To give a clearer understanding as to how the speed of the engine is increased by increasing the amount of fuel injected into the cylinder of the engine, reference may be had to Figures 2 to 5 of the drawings. In Figure 2 the valve element 7 is positioned to bring about operation of the engine at idling speed while the valve element is shown in Figure 3 as positioned for operating the engine at approximately half open throttle, while in Figures 4 and 5 the valve element 7 is positioned for the operation of the engine at approximately full speed or approximately full open throttle.

From the foregoing it will be seen that the injection of fuel in the cylinder of the engine by this device will be efficiently timed in accordance with the cycles of operation of the engine and also the amount of fuel injected each time may be manually controlled for the purpose of varying the speed of operation of the engine and further it may be seen that when it is desired that the engine be stopped, the valve element 7 may be moved to its lowermost position so that during its rotation the fuel will be entirely bypassed back to the fuel supply. This is a very important phase of the invention due to the fact that the bypassing of the fuel back to the fuel supply will prevent vapor locks by providing a rapid flow of fuel from the fuel transfer pump through the plunger cylinders and the rotary valve system back to the fuel supply system and also will permit the removal of any air bubbles which may accumulate in any of the fuel passages or the cylinder for the plunger.

From the foregoing it is believed that a clear understanding can be obtained of the basic principle of operation of this present invention and in the following will be given a detail description of how the basic principle of this invention is built into a complete fuel injection pump.

Reference will now be had to Figures 7 to 11 of the drawings wherein the complete construction of the fuel injection pump is shown and constructed for the injection of fuel at proper times into an engine of the twelve cylinder type. The housing for the pump is indicated in entirety by the character 27 and consists of upper and lower companion sections 28 and 29, the lower section 29 being equipped with an attaching flange 30 having bolt openings 31 to permit mounting of the housing 27 on an engine. The upper and lower sections 28 and 29 of the housing 27 are separated by a mounting 32 for the tappet assemblies 10. The securing of the sections of the housing 27 onto the mounting 32 can be accomplished in any well known manner. The lower section 29 is open to give access to a cam chamber 33 in which the cam 12 is located. The cam 12 is rotatably supported by an anti-friction bearing 34 retained in a seat 35 provided in the lower section 29 of the housing by a retaining ring 36 held on the housing by stud bolts 37. The bypass valve element 7 extends downwardly into cam 12, the latter being bored through the center parallel to the axis thereof to form an opening in which splined ribs are formed in both ends to slidably receive the splined portion of the rotary valve element as at 39, and to permit splining at 38 of cam 12 to a cam shaft or like part of the engine for the driving of cam 12 as well as valve element 7.

The mounting 32 carries a thrust bearing 40 for the cam 12 and the bypass element 7. The mounting 32 is provided with openings 41 to slidably receive the tappets 10 so that the rollers 11 thereof may readily follow the contour of the cam 12 and thereby bring about the operation of the plungers 9. The pump plunger assemblies are indicated by the character 42 and are removably mounted in openings 43 of the upper section 28 of the housing 27.

Figures 13, 14, 15:
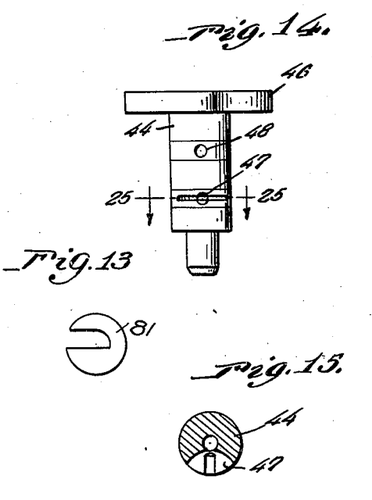
Figure 13 is a plan view illustrating a key employed for holding the plunger and its cylinder assembled when removed from the head.
Figure 14 is a side elevation illustrating a pump plunger cylinder.
Figure 15 is a sectional view taken on line 25—25 of Figure 14.

Each plunger pump assembly 42 consists of a cylinder 44 having a reduced side portion 45 to act as a guide for the plunger 9. The upper end of the cylinder is provided with a flange 46 which rests upon the top wall of the section 28 of the housing. The cylinder has ports 47 and 48 which communicate with the fuel passages 24 and 25, respectively. It will be noted that port 47 (Figure 24) is milled or slotted in a plane normal to the axis of the cylinder so as to provide a minimum piston or plunger travel in the closing of this port. This permits a shorter piston travel for a maximum influx of fuel, reduces the inertia of the reciprocating units of the pump and materially contributes to a satisfactory high speed operation of the pump. The fuel passages 24 and 25 are formed in the upper section 28 of the housing 27. An annular fuel manifold 49 is formed in the section 28 of the housing and has the various fuel passages 24 in communication therewith. The fuel manifold 49 is formed by providing an annular groove in the section 28 of the housing closed by a collar or sleeve 50 which provides a passage for the bypass valve element 7, as clearly shown in Figure 7. Fuel from the source is admitted to the manifold 49, as shown at 51, in Figure 8, which includes a suitable fitting for connection with a fuel supply pipe (not shown). It is to be understood that the fuel supply pipe which is connected to the fuel source will include a suitable fuel pump for delivering fuel into the manifold 49 at a low pressure.

Figure 9:
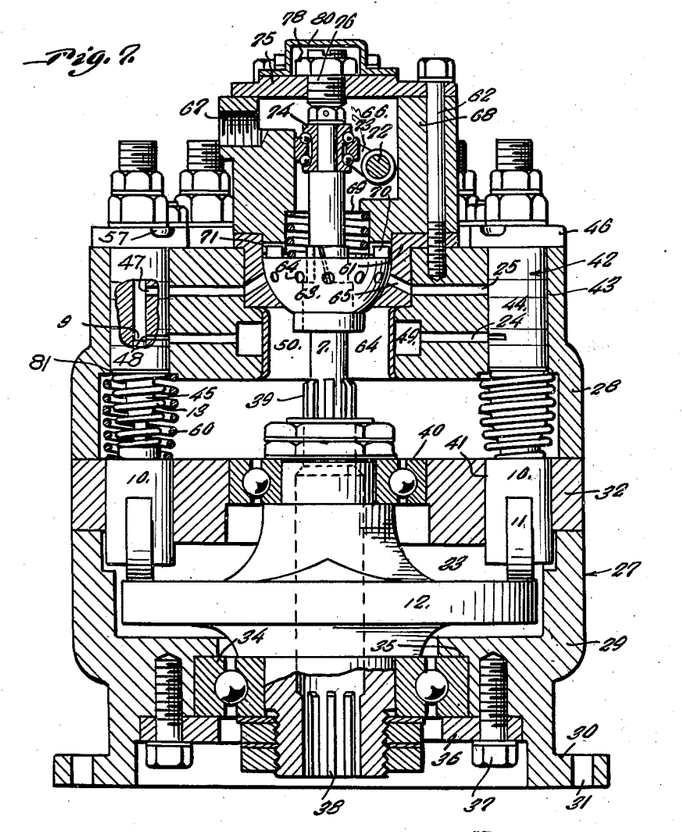
Figure 9 is a plan view illustrating a mounting for the accommodation of the tappets of the pump plunger assemblies, wherein the assemblies are twelve in number to correspond with the cylinders of a twelve-cylinder engine.
Figure 18:
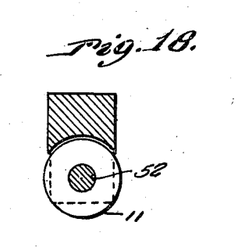
Figure 18 is a fragmentary sectional view illustrating one of the tappet rollers.
Figure 19:
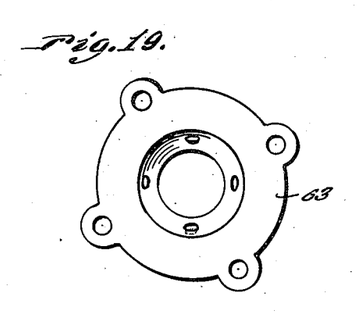
Figure 19 is a top plan view illustrating a mounting for the bypass valve cage.
Figure 20:
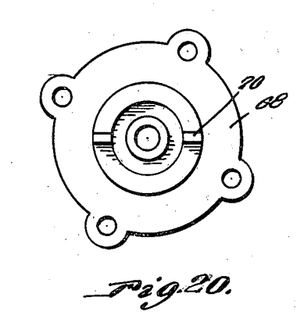
Figure 20 is a bottom plan view illustrating the retaining head for the valve cage.

The mounting 32 has openings 41, as shown in Figure 9, for receiving the tappet assemblies 10 which will permit said tappet assemblies to slide freely towards and from the cam 12 but which will prevent the tappet assemblies from rotating within the openings 41 due to rollers 11 engaging the grooves 53 of the openings 41. It will be noted that roller 11 of Fig. 28 is slightly larger in diameter than tappet 10; it is this part of the roller that extends beyond the tappet periphery and engages grooves 53 of openings 54 and prevents the tappet assembly from rotating within opening 41. The mounting of the tappet assemblies 10 in the openings 41 will permit lifting out of the tappet assemblies from the mounting 32 when desired.

Figure 10:
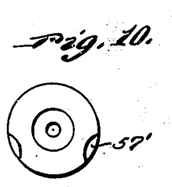
Figure 10 is a plan view illustrating one form of retaining plate for the pump plunger assemblies.
Figure 11:
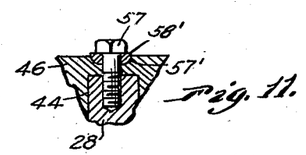
Figure 11 is a detail sectional view, showing the means of securing the type of clamping plate shown in Figure 10 in place on the pump.

The flanges 46 of the cylinders 44 are engaged by retaining plates 54 apertured to receive stud bolts 57 which thread into the section 28 of the housing 27 for retaining the cylinders against displacement from the housing and which also prevent the cylinders from rotating in their respective openings 43. The stud bolts of each plate 54 vary as to size so that in assembling of the cylinders in the openings said cylinders can be only inserted so that their ports will align with the fuel passages 24 and 25. It is to be understood that the plates 54 are so formed as to only fit on the flanges 46 in one way. Instead of employing the plates 54, the flanges 46 of the cylinders may have notches 57' to be engaged by lugs 58' carried by the stud bolts 57. The notches 57' are shown in Figure 10 and the lugs 58' are shown in Figure 11.

It is preferable that the cylinders 44 of the assemblies 42 be provided with suitable packing to establish leakproof connection between said cylinders and the walls of the openings 43.

Figure 12:
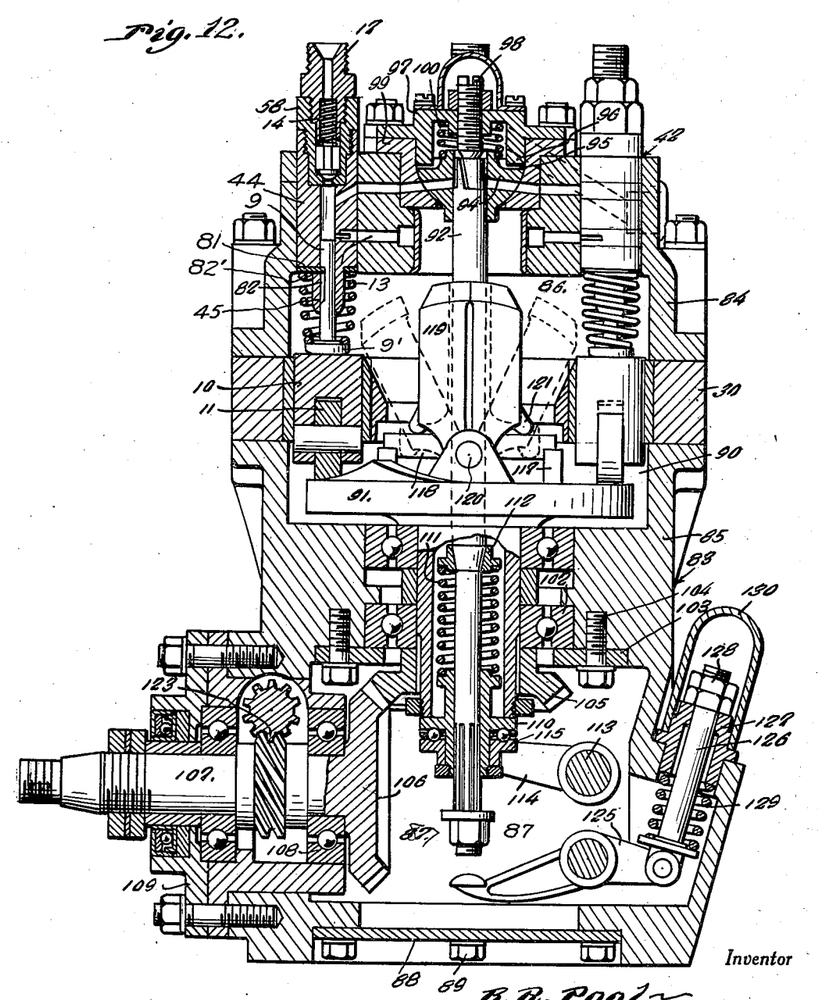
Figure 12 is a vertical sectional view illustrating a modified form of my invention, wherein the pump is governor controlled.
Figure 21:
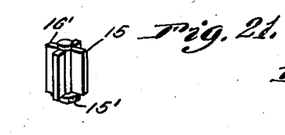
Figure 21 is a perspective view illustrating one of the check valve elements.

Each cylinder 44 at its upper end is internally screw threaded to receive the valve cage 48 of the check valve 15, as clearly shown in Figure 12, the seat for said check valve forming a part of the cage and the latter is threaded into the cylinder and also has threaded therein the fitting 17 forming a seat for the spring 13 of the check valve. The detail construction of the check valve is clearly shown in Figure 21 consisting of a seat engaging portion 15' and a series of radially arranged blades 16'. This construction of mounting the cage and fitting together and into the cylinder permits easy separation of such parts when repairs are necessary or the substitution of one spring for another to vary the action of the check valve.

By referring to Figures 7 and 12 it will be seen how the springs 13 are mounted between the cylinders and the tappet assemblies 10, also it may be desirable to use coil springs 60 as shown in Figure 7, between the tappet assemblies 10 and the section 28 of the housing. The springs 60 are arranged externally of the springs 13.

A valve cage mounting 61 of the flanged type is carried by the section 28 of the housing being secured in place by stud bolts 62 and projecting into a seat provided in the section 28 of the housing and is provided with a semi-spherical shaped seat to receive a semi-spherical shaped valve cage 63 forming a part of the fuel bypass valve mechanism of which the valve element 7 forms a part. By referring to Figures 7 and 12 it will be seen that the valve element 7 extends through the cage 63 and the latter has a series of ports 64 aligning with passages 65 formed in the cage mounting 61 and communicating with the bypass fuel passages 25. The interior of the cage 63 is in direct communication with a bypass fuel chamber 66 which is equivalent of the end A of the bore 6 as shown in the diagrammatical views. The chamber 66 is provided with an internally screw threaded outlet port 67 so that a pipe may be threaded therein for connecting the bypass chamber 66 to the fuel supply for the return of the fuel thereto. The chamber 66 is formed in a head 68 secured on the section 28 of the housing by the stud bolts 62 and rests on the flanged portion of the valve cage mounting 61 and provides a seat for a coil spring 69 bearing on the valve cage 63 to retain the latter in a seated position in the mounting. To prevent rotation of the cage 63, lugs 70 are formed thereon and have a comparatively loose fit in notches 71 formed in the head 68. This will permit the cage 63 to have a limited movement with respect to the mounting so that should the valve element 7 which is in the form of a shaft become slightly out of line, the disalignment will be readily compensated for by the movement of the valve cage with respect to its seat within the mounting 61.

Figure 17:
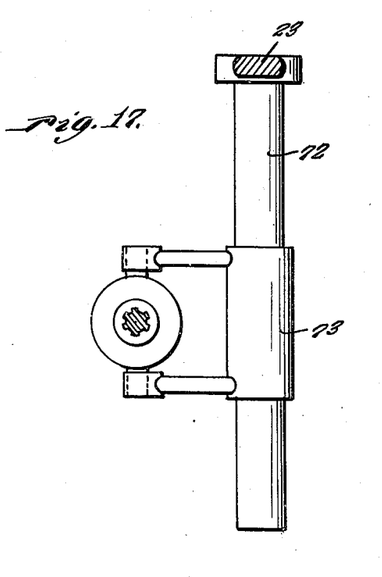
Figure 17 is a fragmentary elevational view, partly in section, showing a hand operated shaft and yoke for connecting said shaft with the by-pass valve element.

The head 68 rotatably supports an operating shaft 72 to which the hand lever 23 is secured (Fig. 17). The shaft 72 has secured thereon a fork 73 including an anti-friction bearing 74 journaled on the valve element 7 and held against endwise movement thereon.

The chamber 66 has a cover plate 75 held in position on the head by the stud bolts 62 and has threaded therein an adjusting bolt 76 held in adjusted position by a lock nut 78. The adjusting bolt has its inner end reduced and tapered to engage the upper end of the valve element 7 acting as an adjustable bearing for said valve element wherein the upward sliding movement of the valve element 7 can be varied for the purpose of providing a control for the maximum delivery of fuel into the cylinders of the engine. This feature is particularly advantageous when the invention is used on engines operated at high altitudes. It permits the use of a given size pump for engines of the same number of cylinders, but of different displacements and provides means whereby the maximum delivery of the pump can be readily adapted to an engine by merely changing the altitude or volume adjustment. A suitable cover 80 is provided on the cover plate 75 to enclose the adjusting nut 78 and the adjusting screw or bolt 76.

Slotted washers 81 (Fig. 13) form seats for the springs 13 and bear against the cylinders 44 and engage flattened portions 82 on the plungers of said cylinders and in grooves 82' on the upper ends of the guides 45 secured to the lower ends of the cylinders for holding the plungers and cylinders assembled when the plunger pump assemblies 42 are removed from the openings 43 in the section 28 of the housing 27.

From the foregoing description and with reference to Figure 7 of the drawings, the detail construction involved in the fuel injection pump for the operation of a twelve cylinder engine will be clearly understood and the operation of this pump is in accordance with the detail description previously set forth relative to the diagrammatical views numbered 1 to 5 in the drawings. This detail construction clearly discloses that any of the plunger pump assemblies 42 can be easily and quickly removed and replaced when desired, also the valve element 7 can be conveniently removed after the removal of the head 68 and the detachment of the fork 73 therefrom. Further, it will be seen that the bypass valve mechanism including the cage 63 and the spring 69 can be easily reached simply by the removal of the head 68 from the housing. Furthermore, the sections of the housing may be readily taken apart which will free the mounting 32 and permit the removal of the cam and associated parts. It will be seen that this detail construction provides an extremely compact pump wherein all parts are readily accessible and that the device can be conveniently mounted on an engine and connected thereto for the rotation of the valve element 7 and the cam connected therewith.

Referring to Figure 12 of the official drawings it will be seen that this figure discloses a modification of this invention wherein the pump is governor controlled, also hand controlled. This type of pump consists of a housing 83 including upper and lower sections 84 and 85 (head and mounting base respectively) between which is located the mounting or tappet ring 30 for the tappet assemblies 10. The upper section 84 is similarly constructed to the section 28 of the housing 27 and accommodates the plunger pump assemblies 42. The upper section 84 has a governor chamber 86 and the lower section 85 has a gear chamber 87 which opens outwardly through the bottom of the lower section and is normally closed by a cover plate 88 held on the housing by stud bolts 89. The lower section 85 of the housing 83 is provided with a cam chamber 90 to accommodate the cam 91 similar in construction to the cam 12. The bypass valve element is indicated by the character 92 and is shown as extending from the gear chamber 87 through the cam 91, governor chamber 86 and into the bypass cage 94. The cage 94 is constructed similar to the cage 63 except that the cage 94 has notches 95 to loosely receive lugs 96 formed on the cover plate 97. The cover plate 97 is secured onto the upper section 84 similar to the securing of the cover plate 75 on the upper section of the housing 27. The bypass valve element 92 is engaged at the upper end with the adjusting screw 98 for varying the upward movement of the bypass valve element 92. The upper section 84 of the housing 83 is equipped with the fuel passages and fuel manifolds as in the form of the invention previously described and shown in Figure 7. The cage 94 is yieldably held in its cage mounting 99 by the spring 100.

The hub portion of the cam 91 is longer than the hub of the cam 12 and is journaled in antifriction bearings 102 mounted in seats provided therefor in the section 85 of the housing 83. A retaining ring 103 is employed for retaining the bearings 102 in place and is removably secured on the housing by stud bolts 104. The hub of the cam 91 has splined thereon a gear 105 meshing with a drive gear 106 of a drive shaft 107 journaled in the housing 83 and supported by carrier bearings 108. The drive shaft 107 is driven from the engine to which this pump is applied. A suitable removable cover plate 109 retains the carrier bearings in place and permits easy removal thereof when desired. The cover plate 109 is provided with suitable packing to prevent leakage of lubricant around the drive shaft 107 and from the gear chamber 87.

A flanged sleeve 110 is splined on the lower portion of the by-pass element 92 within the gear chamber 87 and forms a support for one end of a governor spring 111, the other end of which seats against a collar 112 fixed on the by-pass valve element 92. A hand operated shaft 113 is journaled in the housing 83 and extends into the gear chamber 87 and has secured thereto a forked arm 114 engageable with a collar 115 journaled on the flanged sleeve 110. A hand lever (not shown) is secured on the shaft 113 whereby the position of the sleeve 110 can be varied endwise of the by-pass valve element 92 for increasing and decreasing the tension of the spring 111.

The cam 91 has formed thereon pairs of spaced lugs 117 and slidable between said lugs is a bar 118 formed on the by-pass valve element 92. Pivotally mounted on the cam 91 and arranged to receive therebetween the by-pass valve element 92 is a pair of governor weights 119, the pivot for said governor weights being shown at 120. Projections 121 are formed on the weights 120 and ride upon the bar 118. If desired, rollers may be substituted for the projections 121. The bar 118 fitting between the pairs of lugs 117 provide the driving conection between the cam 91 and the by-pass element 92 so that the latter will rotate with the cam, the latter being driven by the shaft 107 through the gears 106 and 105. The governor weights 120 rotate with the cam 91 and are caused to pivot outwardly by centrifugal action forcing downwardly the bar 118 carrying with the latter the by-pass valve element 92 against the action of the spring 111. As heretofore described, the lowering of the by-pass valve element 92 brings about a complete by-passing of the fuel back to the fuel source stopping the injection of fuel into the engine. Through the adjustment of the shaft 113 to bring about variance of tension on the spring 111 varies the action of the governor weights 120 on the by-pass valve element 92.

A low pressure fuel pump (not shown) is mounted on the housing 83 exteriorly of the latter and the shaft of the pump is geared to the drive shaft 107, as shown at 123. The fuel pump 122 is connected in any well known manner with the fuel supply and to the fuel manifold by a pipe 124.

A lever 125 is pivotally mounted in the gear chamber 87 and the free end underlies the lower end of the by-pass valve element 92 and the other end thereof is pivoted to a spring pressed plunger 126 mounted in a sleeve 127 carried by the housing 83. Nuts 128 are threaded on the plunger 126 to engage with the sleeve 127 for varying the action of the spring 129. A suitable cover 130 is arranged over the exposed end of the plunger 126 and may be readily removed to permit adjustment of the nuts 128 on the plunger. The purpose of the lever 125 is to control the idling speed of the engine. When the hand lever is operated to move the by-pass valve element 92 downward it will contact the lever 125 and be resisted in further movement thereby. This positions the by-pass valve element 92 to bring about operation of the engine at idling speed. However, further movement of the valve element 92 downwardly by the hand lever will caues the lever 125 to pivot against the action of the spring 129 allowing the full amount of fuel to by-pass back to the fuel supply and consequently bring about stopping of the engine. The normal position of the lever 125 may be varied by the adjustment of the plunger 126 for the purpose of varying the idling speed of the engine.

The governor spring 111 controls the maximum speed of operation of the engine by the governor and when the speed of the engine reaches a maximum speed the governor weights 119 are thrown outwardly by centrifugal force, forcing the bar 118 downwardly carrying the valve element 92 therewith increasing the amount of by-pass fuel back to the fuel supply, consequently reducing the amount of fuel injected into the cylinders of the engine which slows down the latter. By changing the position of the sleeve 110 through the manipulation of the hand lever 116 maximum speed of the engine under the control of the governor mechanism can be varied. The changing of the position of the sleeve 110 varies the tension of the spring 111 and in this way brings about variance in the action of the governor mechanism.

The retaining ring 103 is preferably of the split type so that when detached it can be easily removed by the opening provided in the lower end of the section 85 of the housing 83. This opening in the housing gives access to all of the parts within the gear chamber 87 and by removal of the upper section 84 access may be had to the governor weights and associated parts as well as the upper part of the by-pass valve element 92 and the parts associated therewith.

It is believed that the simplicity and advantages of this invention will be apparent to those skilled in the art to which such a device relates, ando while I have herein set forth a satisfactory embodiment of the invention, it is to be understood that such changes therefrom as fall within the scope of my claims may be resorted to when desired.

Having thus described my invention, what I claim is:

1. A fuel injection pump for an internal combustion engine comprising a casing having an aperture, a cylinder and plunger unit arranged to fit within said aperture, a spring normally biasing said plunger in one direction and reacting against one end of said cylinder, a washer between said spring and said cylinder having an eccentric slot therein, said plunger being formed on one side over a predetermined portion of its length to enter said slot in only one position and be non-rotatively secured to said washer, and means to secure said washer to said cylinder, whereby said washer locks said unit for assembly and disassembly as such in said aperture.

2. A fuel injection pump for an internal combustion engine comprising a housing having an aperture therein, a sleeve in said aperture with a cylinder passage therein, a piston in said passage and arranged to move therein, said piston having a section of reduced cross-sectional area, a retainer washer secured to said sleeve adjacent one end thereof in a manner to prevent relative movement between said washer and said sleeve in a direction parallel to the longitudinal axis of said sleeve, and means on said washer arranged to engage said section of reduced cross-sectional area.

3. A fuel injection pump for an internal combustion engine comprising a housing having an aperture therein, a sleeve in said aperture with a cylindrical passage therein, a piston in said passage and arranged to move therein, said piston having a section of reduced cross-sectional area, a guide on said sleeve to guide said piston, said guide having a transverse slot therein, and a retainer washer arranged to engage said slot and said section of reduced cross-sectional area.

4. A fuel injection pump for an internal combustion engine comprising a housing having an aperture therein, a sleeve in said aperture with a cylindrical passage therein, a piston in said passage and arranged to move therein, said piston having a section of reduced cross-sectional area and a section of increased cross-sectional area, a guide on said sleeve to guide said piston, said guide having a transverse slot therein, a retainer washer arranged to engage said slot and said section of reduced cross-sectional area, and a spring between said section of increased cross-sectional area and said retainer washer to normally maintain said piston at one end of its stroke.

5. A fuel pump for an internal combustion engine comprising a housing, a series of fuel injection units in said housing having fuel outlets, means to control the fuel fed from said outlets including a fuel by-pass leading from each of said units, a common valve for said by-passes, means to manually vary the position of said valve to control the speed of said engine, and an adjustable stop for said valve to vary the maximum amount of fuel discharged from said outlets to permit the engine to be readily adjusted for operation at different altitudes, and to permit use of said pump for engines of different displacements.

6. A fuel injection pump for an internal combustion engine comprising a plurality of individual fuel injection units, means to supply fuel to each of said units leading from a fuel supply chamber, means connected to said units to discharge fuel therefrom, and means separate from said fuel supply means connected to each of said fuel injection units to determine the quantity of fuel delivered from said fuel discharge means comprising a conduit, and a rotary valve in said conduit, said valve being adjustable to vary the period of closure of said conduit during a complete cycle of said pump for each of said fuel injection units, and adjustable stops to limit the movement of said valve member for both maximum and minimum fuel delivery.

BYRON R. POOL.